United States Patent
Stadnyk et al.

(10) Patent No.: US 9,580,127 B1
(45) Date of Patent: Feb. 28, 2017

(54) FLEXIBLE MOUNTING SYSTEM FOR MOTORCYCLE WINDSHIELD

(71) Applicant: Mark A. Stadnyk, Ridge Manor, FL (US)

(72) Inventors: Mark A. Stadnyk, Inverness, FL (US); Steve Chaikin, Inverness, FL (US)

( * ) Notice: Subject to any disclaimer, the term of this patent is extended or adjusted under 35 U.S.C. 154(b) by 0 days.

(21) Appl. No.: 14/255,163

(22) Filed: Apr. 17, 2014

Related U.S. Application Data

(60) Provisional application No. 61/813,729, filed on Apr. 19, 2013.

(51) Int. Cl.
| | |
|---|---|
| *B62J 17/02* | (2006.01) |
| *B62J 17/04* | (2006.01) |
| B62K 11/14 | (2006.01) |
| B62J 9/00 | (2006.01) |
| B62K 21/12 | (2006.01) |
| B62J 1/20 | (2006.01) |

(52) U.S. Cl.
CPC .................. *B62J 17/04* (2013.01); *B62J 1/20* (2013.01); *B62J 9/005* (2013.01); *B62K 11/14* (2013.01); *B62K 21/12* (2013.01)

(58) Field of Classification Search
CPC ... B62J 17/04; B62J 1/20; B62J 9/005; B62K 11/14; B62K 21/12
USPC ................................................ 296/78.1, 77.1
See application file for complete search history.

(56) References Cited

U.S. PATENT DOCUMENTS

| | | | | |
|---|---|---|---|---|
| 6,293,606 B1* | 9/2001 | Jarosz et al. | ................. | 296/78.1 |
| 7,360,819 B1* | 4/2008 | Hahne | .......................... | 296/78.1 |
| 7,828,359 B2* | 11/2010 | Caprio | .......................... | 296/78.1 |

* cited by examiner

*Primary Examiner* — Joseph D Pape
*Assistant Examiner* — Dana Ivey

(57) ABSTRACT

Left and right coupling assemblies are adapted to couple the windshield to the motorcycle. Left and right bars have apertures for securing the bars to the windshield. Left and right peg sets have upper and lower pegs extending through the apertures of an associated bar and through associated short slots in the left and right coupling assemblies. Each post has a head located between the windshield and an associated bar. Each post has a free end spaced inwardly of the short slots. A nut is coupled to the free end of each post. A washer is slidably received on each post between an associated short slot and nut. A coil spring is slidably received on each post between an associated washer and nut. A leaf spring coupled between each bar and an associated washer urges the posts and the windshield toward a laterally central location.

4 Claims, 4 Drawing Sheets

FLEXIBLE MOUNTING SYSTEM FOR MOTORCYCLE WINDSHIELD

RELATED APPLICATIONS

The present application is based upon and claims the benefit of Provisional Application Ser. No. 61/813,729 filed Apr. 19, 2013, the subject matter of which is incorporated by reference herein. It is an improvement over the inventions of two earlier patents, U.S. Pat. No. 7,458,626 issued Dec. 2, 2008 and U.S. Pat. No. 7,832,783 issued Nov. 16, 2010, the subject matter of which patents is incorporated herein by reference.

BACKGROUND OF THE INVENTION

Field of the Invention

The present invention relates to a flexible mounting system for motorcycle windshield which allows lateral and forward movement so that the entire windshield moves out of the way if the handlebars make contact, thereby allowing full handlebar motion which would otherwise be prevented if the same windshield were to be hard-mounted, the mounting and the movement of the windshield being done in a safe, convenient and economic manner.

Description of the Prior Art

The use of motorcycle windshield mounting systems of known designs and configurations is known in the prior art. More specifically, motorcycle windshield mounting systems of known designs and configurations previously devised and utilized for the purpose of mounting windshields on motorcycles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a flexible mounting system for motorcycle windshield that allows lateral and forward movement so that the entire windshield moves out of the way if the handlebars make contact.

In this respect, the flexible mounting system for motorcycle windshield according to the present invention substantially departs from the conventional concepts and designs of the prior art, and in doing so provides an apparatus primarily developed for the purpose of allowing lateral and forward movement so that the entire windshield moves out of the way if the handlebars make contact.

Therefore, it can be appreciated that there exists a continuing need for a new and improved flexible mounting system for motorcycle windshield which can be used for allowing lateral and forward movement so that the entire windshield moves out of the way if the handlebars make contact. In this regard, the present invention substantially fulfills this need.

SUMMARY OF THE INVENTION

In view of the foregoing disadvantages inherent in the known types of motorcycle windshield mounting systems of known designs and configurations now present in the prior art, the present invention provides an improved flexible mounting system for motorcycle windshield. As such, the general purpose of the present invention, which will be described subsequently in greater detail, is to provide a new and improved flexible mounting system for motorcycle windshield and method which has all the advantages of the prior art and none of the disadvantages.

To attain this, the present invention essentially comprises left and right coupling assemblies adapted to couple the windshield to the motorcycle. Left and right bars 46 have apertures 47 for securing the bars to the windshield. Left and right peg sets have upper pegs 48 and lower pegs 50 extending through the apertures of an associated bar and through associates short slots 42 in the left and right coupling assemblies. Posts 74, 76 are provided. Each post has a head 75 located between the windshield and an associated bar. Each post has a free free end 75 located inwardly of the short slots. A nut 82 is coupled to the free end of each post. A washer 84 is slidably received on each post between a associated short slot and nut. A coil spring 86 is slidably received on each post between an associated washer and nut.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved flexible mounting system for motorcycle windshield which has all of the advantages of the prior art motorcycle windshield mounting systems of known designs and configurations and none of the disadvantages.

It is another object of the present invention to provide a new and improved flexible mounting system for motorcycle windshield which may be easily and efficiently manufactured and marketed.

It is further object of the present invention to provide a new and improved flexible mounting system for motorcycle windshield which is of durable and reliable constructions.

An even further object of the present invention is to provide a new and improved flexible mounting system for motorcycle windshield which is susceptible of a low cost of manufacture with regard to both materials and labor, and which accordingly is then susceptible of low prices of sale to the consuming public, thereby making such flexible mounting system for motorcycle windshield economically available to the buying public.

Lastly, another object of the present invention is to provide a flexible mounting system for motorcycle windshield for allowing lateral and forward movement so that the entire windshield moves out of the way if the handlebars make contact and returns to its original position after contact has been withdrawn.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
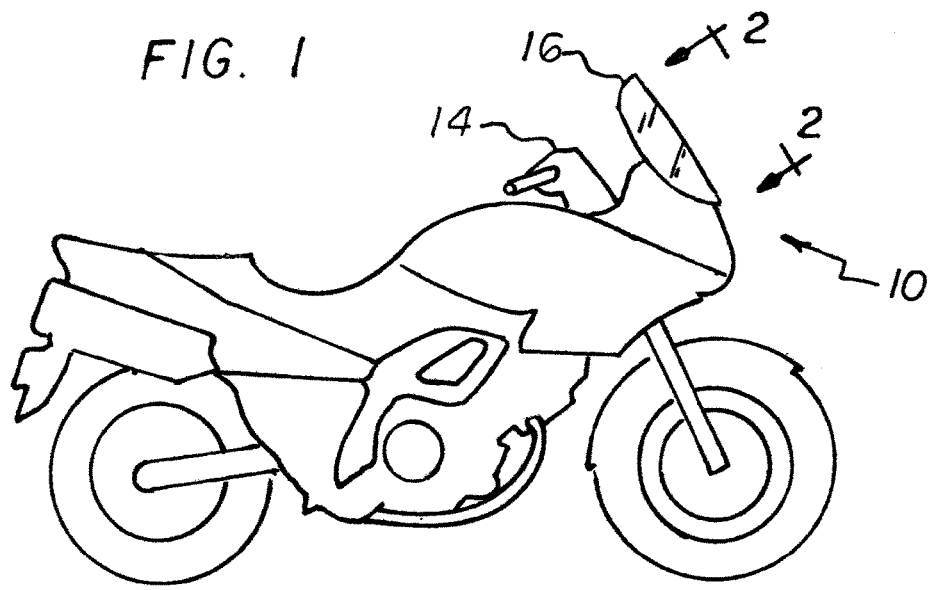
FIG. 1 is a side elevational view of a motorcycle equipped with a flexible mounting system for motorcycle windshields constructed in accordance with the principles of the present invention.
Figure 2:
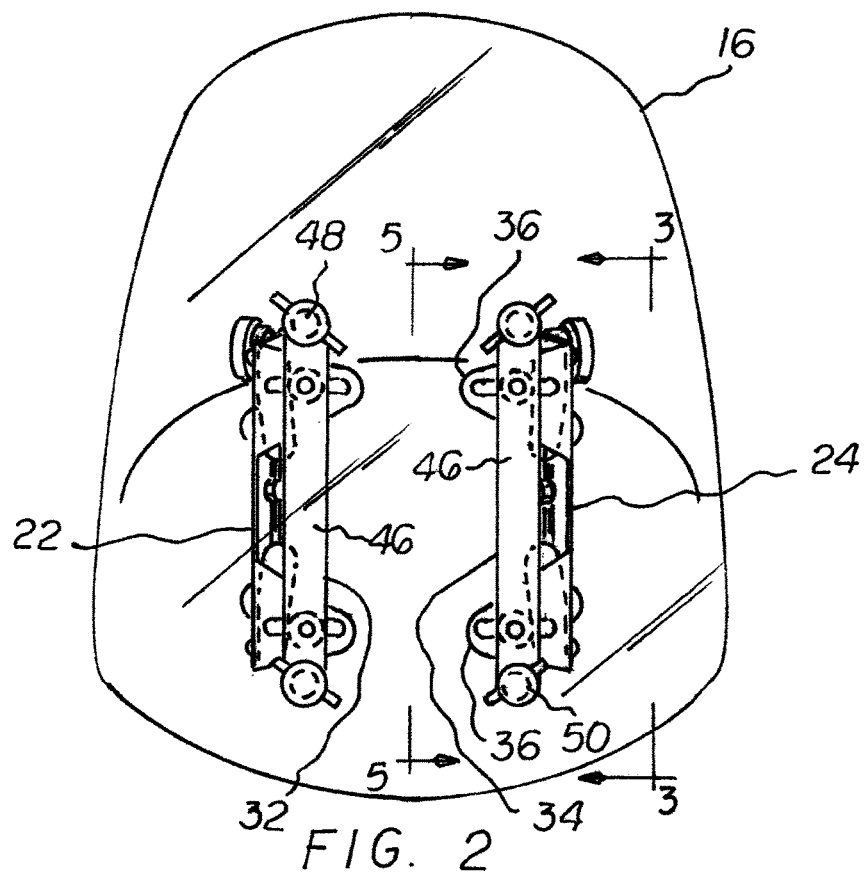
FIG. 2 is a front elevational view taken along line 2-2 of FIG. 1.
Figure 3:
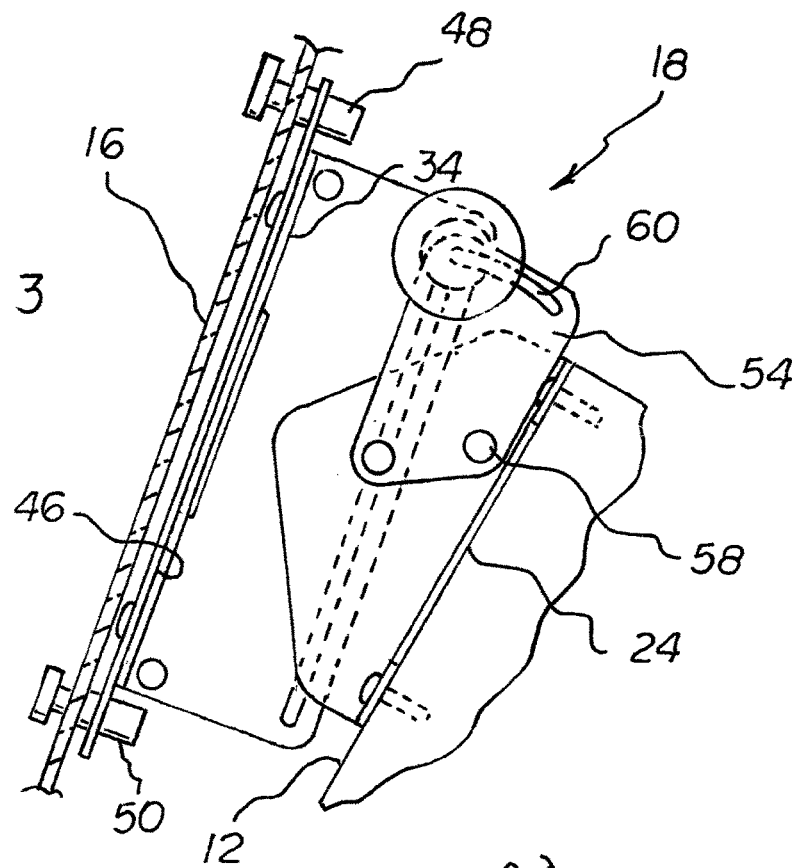
FIG. 3 is a cross sectional view taken along line 3-3 of FIG. 2.
Figure 4:
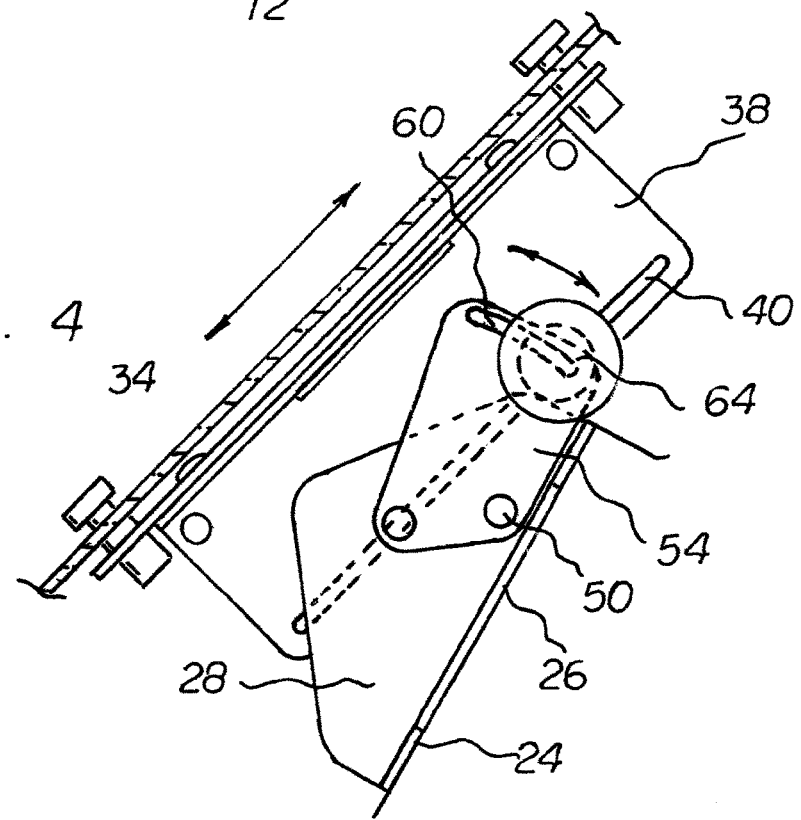
FIG. 4 is a cross sectional view similar to FIG. 2 but with the windshield in a deflected orientation.
Figure 5:
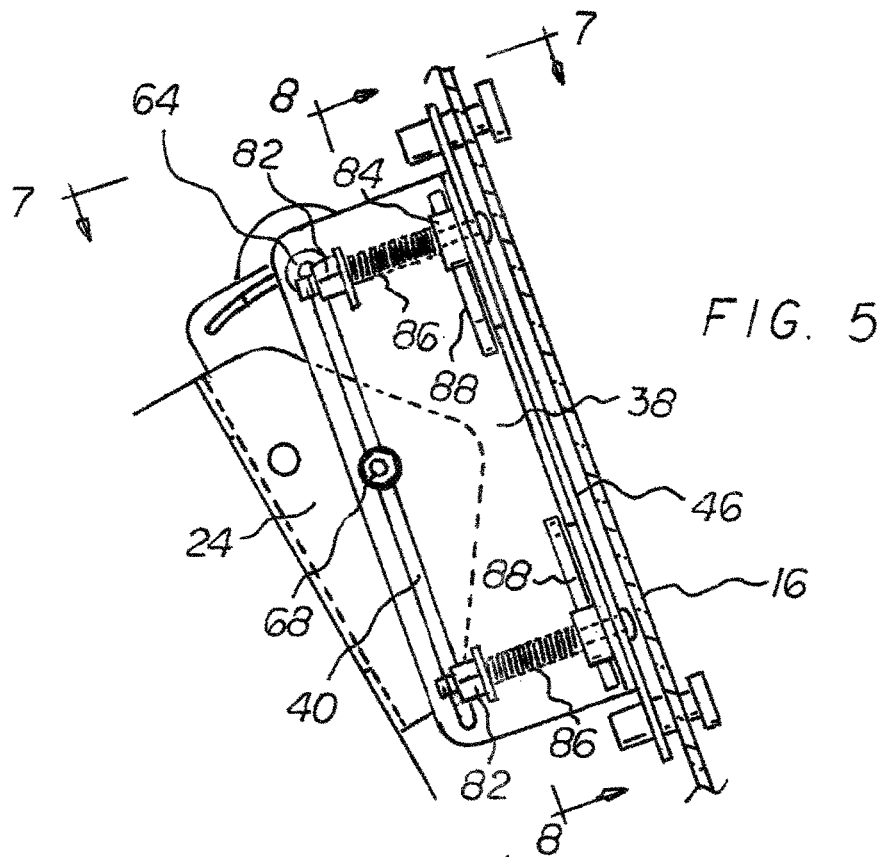
FIG. 5 is a cross sectional view taken along line 5-5 of FIG. 2.
Figure 6:
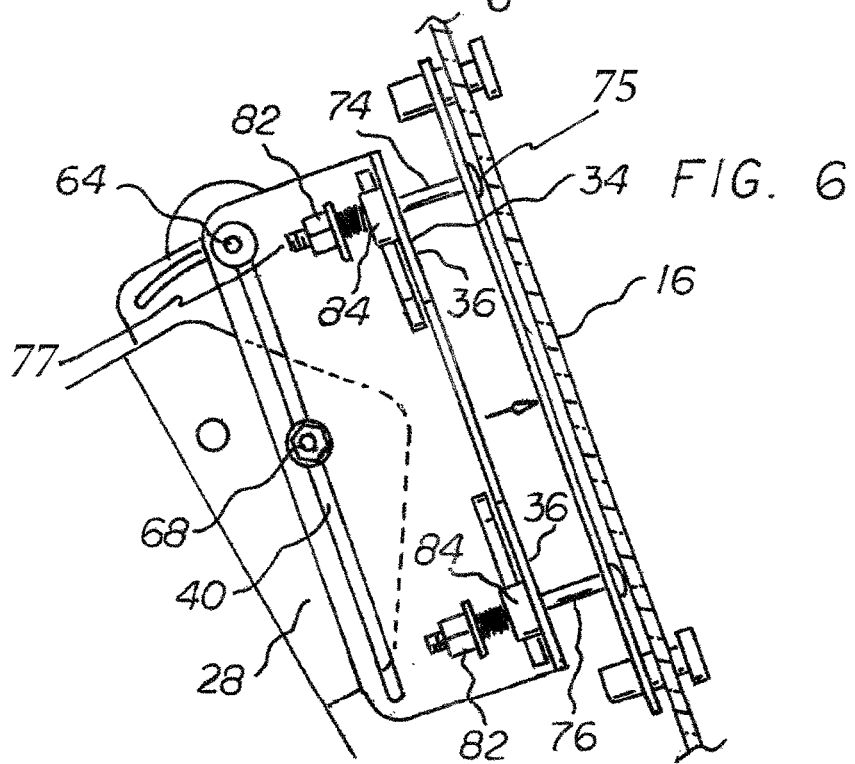
FIG. 6 is a cross sectional view similar to FIG. 5 but with the windshield in an extended orientation.
Figure 7:
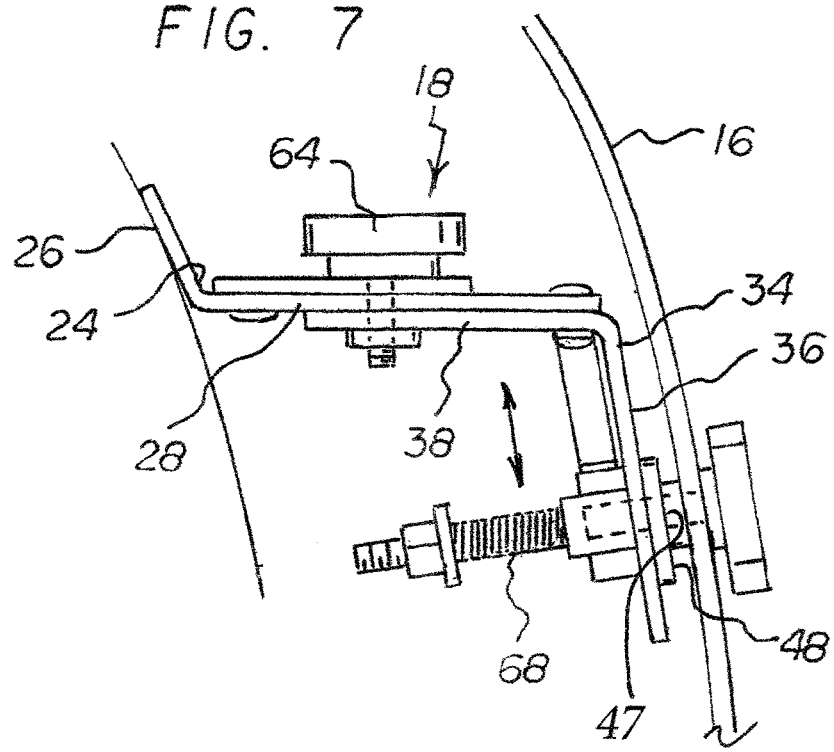
FIG. 7 is a plan view taken along line 7-7 of FIG. 5.
Figure 8:
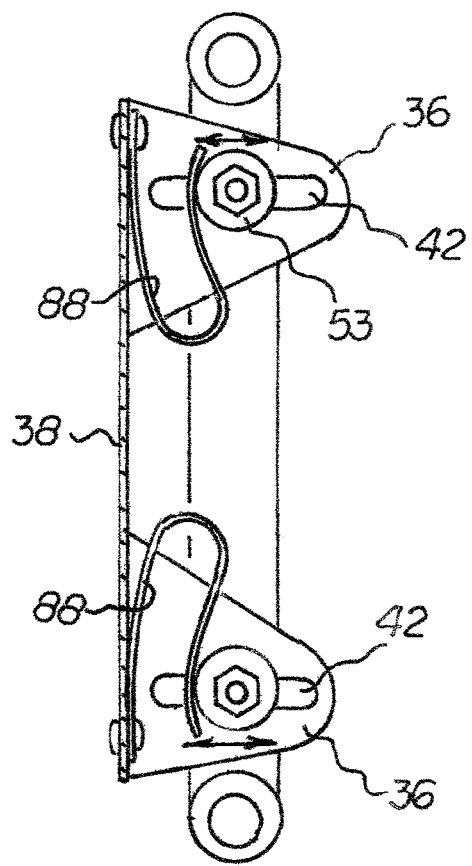
FIG. 8 is a cross sectional view taken along line 8-8 of FIG. 5.

With reference now to the drawings, and in particular to FIG. 1 thereof, the preferred embodiment of the new and improved flexible mounting system for motorcycle windshield embodying the principles and concepts of the present invention and generally designated by the reference numeral 10 will be described.

The present invention, the flexible mounting system for motorcycle windshield 10 is comprised of a plurality of components. Such components in their broadest context include left and right coupling assemblies, bars, and peg sets. Such components are individually configured and correlated with respect to each other so as to attain the desired objective.

First provided is a motorcycle 10 of the type having a forward support surface 12, upwardly extending handlebars 14, and a generally vertical windshield 16. The motorcycle is equipped with a flexible mounting system 18 for the windshield which is adapted to allow lateral and forward movement so that the entire windshield moves out of the way if the handlebars make contact and the windshield returns to its original position after contact has been withdrawn. In this manner full handlebar motion is allowed which would otherwise be prevented if the same windshield were to be hard-mounted. The mounting and the movement of the windshield is done in a safe, convenient, and economic manner.

The windshield 16 has a top, a bottom, a left side, and a right side. The windshield has an interior surface and an exterior surface. The windshield is fabricated of a rigid transparent material.

Next provided is a left interior bracket 22 attached to the support surface. A similarly configured right interior bracket 24 is attached to the support surface. The left and right interior brackets are laterally spaced and extend generally vertically. The left and right interior brackets each have a fixed base section 26 attached to the support surface of the motorcycle. The left and right interior brackets each have an outwardly extending section 28 having a pentagonal configuration.

A left exterior bracket 32 attached to the windshield is next provided. A similarly configured right exterior bracket 34 is operatively coupled to the windshield. The left and right exterior brackets are laterally spaced and extending generally vertically. The left and right exterior brackets each have two movable base sections 36 and an inwardly extending section 38. Each inwardly extending section has a rectangular configuration. A linear long slot 40 extends through each inwardly extending section. A linear extending short slot 42 extends through each movable base section.

Next provided are a left bar 46 and a similarly configured right bar. The left and right bars have upper ends with upper pegs 48 and lower ends with lower pegs 50. The upper and lower pegs secure the left and right bars generally vertically, laterally spaced from each other, and rearwardly spaced from the windshield.

A left intermediate plate 54 and a similarly configured right intermediate plate 56 are next provided. The left and right intermediate plates each have a pivot pin 58 coupling the left and right intermediate plates to the left and right outwardly extending sections. The left and right intermediate plates each have an arcuate slot 60 extending there through.

Next, a static adjustment assembly is provided. The statis adjustment assembly includes a left primary threaded fastener 64 and a right primary threaded fastener 64. The left and right primary threaded fasteners extend through an associated arcuate slot and an associated linear slot for adjusting the angular orientation of the windshield with respect to the support surface of the motorcycle. The static adjustment assembly includes a left secondary threaded fastener 68 and a right secondary threaded fastener 68. The left and right secondary threaded fasteners extend through an associated outwardly extending section and an associated linear slot for adjusting the elevational orientation of the windshield with respect to the support surface of the motorcycle.

Lastly, a dynamic adjustment assembly is provided. The dynamic adjustment assembly includes a left post set formed of a left upper threaded post 74 and an associated left lower threaded post 76. The dynamic adjustment assembly includes a right peg set formed of a right upper threaded post 78 and an associated right lower threaded post 80. The upper and lower threaded posts of each peg set extend through an associated bar and an associated short slot. Each threaded post has a head located between the windshield and an associated bar. Each threaded post has a free end spaced inwardly of the short slots. A nut 82 is coupled to the free end of each threaded post. A washer 84 is slidably received on each threaded post between an associated short slot and an associated nut. A coil spring 86 is slidably received on each threaded post between an associated washer and an associated nut. The coil springs are adapted to facilitate movement of the windshield toward and away from the support surface. A leaf spring 88 is coupled between each movable base section and an associated washer urging the threaded posts and the windshield toward a laterally central extent of the support surface and the motorcycle.

A motorcycle windshield normally attaches to hard mounting points on the motorcycle. Even when attached to known adjustable brackets, which themselves move up/down and forward/backward, the windshield is still hard-mounted, immobilized, once the adjustable brackets are tightened down. This means that if something hits the sides of the shield, for example, the hand guards on the handlebars, there will be an interference problem. Normally motorcycle windshields are designed to be narrow enough to avoid any interference issues with the turning of handlebars, however, this also means that the width of the shield is restricted and, thereby the wind protection for the rider is restricted.

What if the rider wants better wind protection with a wider windshield? Currently, with a fixed mounting system that has no lateral movement, a wider windshield would prevent the handlebars from reaching their full-lock position. This means the rider would have a restricted turning radius; would not be able to lock his handlebars in the park, full-left, position; and could possibly damage the windshield if the handlebars strike the edge too hard.

The present invention is a solution which provides a flexible windshield mounting system that allows lateral and forward movement so that the entire windshield moves out of the way if the handlebars make contact, allowing full handlebar motion which would otherwise be prevented if this same wide windshield were hard-mounted. This is accomplished by mounting the windshield to two rigid metal bars, or a single rigid plate, which itself is spring-loaded in two directions to allow the windshield to move out of the way temporarily. Pushing on the sides of the shield, whether forward or sideways, compresses the springs and shifts the shield out of its normal centered position. Once the interference, pressure from the back or side, is relieved, the springs return the shield to its normal centered position.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flexible mounting system (10) for a windshield (16) of a motorcycle (10) including:
   left and right coupling assemblies adapted to couple the windshield to the motorcycle;
   left and right bars (46) with apertures (47) for securing the bars to the windshield;
   left and right peg sets with upper pegs (48) and lower pegs (50) extending through the apertures of the bars and through short slots (42) in the left and right coupling assemblies;
   posts (74)(76), each post having a head (75) located between the windshield and one of the bars, each post having a free end (77), a nut (82) coupled to the free end of each post, a washer (84) slidably received on each post between an associated one of the short slots and an associated one of the nuts, a coil spring (86) slidably received on each post between an associated one of the washers and an associated one of the nuts; and
   a leaf spring coupled between each bar and an associated washer urging the posts and the windshield toward a laterally central location.

2. The flexible mounting system as set forth in claim 1 wherein each coupling assembly includes an interior bracket coupled to a support surface of the motorcycle, an exterior bracket coupled to the windshield with the short slots formed in each exterior bracket, and an intermediate bracket operatively coupling each interior bracket to an associated one of the exterior brackets.

3. The flexible mounting system as set forth in claim 2 wherein each interior bracket has a long slot for adjusting the elevational orientation of the windshield with respect to the motorcycle and wherein each intermediate bracket has an arcuate slot for adjusting the angular orientation of the windshield with respect to the motorcycle.

4. A motorcycle (10) of the type having a forward support surface (12), upwardly extending handlebars (14), a generally vertical windshield (16), the motorcycle being equipped with a flexible mounting system (18) comprising, in combination:
   the windshield (16) having a top, a bottom, a left side, and a right side, the windshield having an interior surface and an exterior surface, the windshield being fabricated of a rigid transparent material;
   a left interior bracket (22) attached to the forward support surface and a similarly configured right interior bracket (24) attached to the forward support surface, the left and right interior brackets being laterally spaced and extending generally vertically, the left and right interior brackets each having a fixed base section (26) attached to the support surface of the motorcycle, the left and right interior brackets each having an outwardly extending section (28) having a pentagonal configuration;
   a left exterior bracket (32) attached to the windshield and a similarly configured right exterior bracket (34) operatively coupled to the windshield, the left and right exterior brackets being laterally spaced and extending generally vertically, the left and right exterior brackets each having two movable base sections (36) and an inwardly extending section (38), each inwardly extending section having a rectangular configuration, a linear long slot (40) extending through each inwardly extending section, a linear extending short slot (42) extending through each movable base section;
   a left bar (46) and a similarly configured right bar, the left and right bars having upper ends with upper pegs (48) and lower ends with lower pegs (50), the upper and lower pegs securing the left and right bars generally vertically, laterally spaced from each other, and rearwardly spaced from the windshield;
   a left intermediate plate (54) and a similarly configured right intermediate plate (56), the left and right intermediate plates each having a pivot pin (58) coupling the left and right intermediate plates to the left and right outwardly extending sections, the left and right intermediate plates each having an arcuate slot (60) extending there through;

a static adjustment assembly including a left primary threaded fastener (64) and a right primary threaded fastener (64), the left and right primary threaded fasteners extending through an associated arcuate slot and an associated linear slot for adjusting the angular orientation of the windshield with respect to the support surface of the motorcycle, the static adjustment assembly including a left secondary threaded fastener (68) and a right secondary threaded fastener (68), the left and right secondary threaded fasteners extending through an associated outwardly extending section and an associated linear slot for adjusting the elevational orientation of the windshield with respect to the support surface of the motorcycle; and a dynamic adjustment assembly including a left post set formed of a left upper threaded post (74) and an associated left lower threaded post (76), the dynamic adjustment assembly including a right peg set formed of a right upper threaded post (78) and an associated right lower threaded post (80), the upper and lower threaded posts of each peg set extending through an associated bar and an associated short slot, each threaded post having a head located between the windshield and an associated bar, each threaded post having a free end spaced inwardly of the short slots, a nut (82) coupled to the free end of each threaded post, a washer (84) slidably received on each threaded post between an associated short slot and an associated nut, a coil spring (86) slidably received on each threaded post between an associated washer and an associated nut, the coil springs adapted to facilitate movement of the windshield toward and away from the support surface, a leaf spring (88) coupled between each movable base section and an associated washer urging the threaded posts and the windshield toward a laterally central extent of the support surface and the motorcycle.

\* \* \* \* \*